United States Patent [19]

Sato

[11] Patent Number: 4,790,068

[45] Date of Patent: Dec. 13, 1988

[54] TERMINATION TOOL

[75] Inventor: Kensaku Sato, Tokyo, Japan

[73] Assignee: Hirose Electric Co., Ltd., Tokyo, Japan

[21] Appl. No.: 128,902

[22] Filed: Dec. 4, 1987

[30] Foreign Application Priority Data

Dec. 5, 1986 [JP] Japan ................................ 61-288970

[51] Int. Cl.⁴ ........................ B23P 19/04; B21D 7/06

[52] U.S. Cl. ........................................ 29/761; 72/410; 72/412; 72/461; 72/477; 81/422; 29/751

[58] Field of Search ................. 72/410, 409, 416, 477, 72/472, 442, 447, 461, 412; 29/751, 748, 761; 81/422, 423

[56] References Cited

U.S. PATENT DOCUMENTS

| | | | |
|---|---|---|---|
| 3,212,317 | 10/1965 | Lynch, Jr. | 81/423 |
| 3,416,212 | 12/1968 | Busler et al. | 29/761 |
| 3,571,888 | 3/1971 | Filippo | 29/751 |
| 3,594,887 | 7/1971 | Over | 29/761 |
| 3,732,718 | 5/1973 | Barberio et al. | 72/410 |
| 3,903,725 | 9/1975 | Rommel | 72/410 |
| 3,931,671 | 1/1976 | Dittmann | 72/461 |
| 4,534,107 | 8/1985 | Maack | 29/751 |

FOREIGN PATENT DOCUMENTS

| | | | |
|---|---|---|---|
| 12342 | 6/1969 | Japan | 72/410 |
| 557849 | 5/1977 | U.S.S.R. | 72/416 |

*Primary Examiner*—Daniel C. Crane
*Attorney, Agent, or Firm*—Takeuchi Patent Office

[57] ABSTRACT

A termination tool for terminating a conductor to a contact or terminal having a connecting section for connection with the conductor and a contacting section for contact with a mating contact. The connecting section has either piercing walls or clamp tabs and strain relief tabs. The termination tool consists of a fixed base or head for supporting the contact and a movable die movable toward the fixed base to terminate the contact by either piercing or crimping.

2 Claims, 3 Drawing Sheets

TERMINATION TOOL

BACKGROUND OF THE INVENTION

The present invention relates to termination tools for terminating by crimping or piercing a conductor to a connector contact or terminal.

FIG. 4 shows a conventional manual crimping termination tool in the art. It consists of a fixed grip 1 and a movable grip 2 pivoted to the fixed grip with a pin 1*a*. The fixed grip 1 has at the front end a fixed base 5 and a receiving recess into which the contacting section of a crimping type contact or terminal is inserted in such a manner that the back of the contact may rest on the support 51.

The movable grip 2 has at the front end a movable head 6 which moves toward or away from the fixed base 5 when the movable grip 2 is squeezed or released. The movable head 6 has a pair of side walls 62A and 62B which define an opening 61 in which a crimping die 7 is able to mount with a shaft screw 64.

The movable die 7 consists of a sheath crimping plate 71, a wire crimping plate 72, and a reinforcing plate 73, which are brought together with a plurality of knock pins 74. The reinforcing plate 73 serves also as a stopper for putting a certain limit on the amount of crimping. The sheath or wire crimping plate 71 or 72 has a U-shaped recess 75 or 76 for crimping the sheath or wire clamp tabs of a contact.

In operation, when both the grips 1 and 2 are squeezed after a crimping type contact is inserted into the receiving recess of the fixed head 5 and an exposed wire is placed on the connecting section of the contact, the movable head 6 is advanced toward the fixed head 5 for termination by crimping with the crimping die 7.

The above crimping tool is useful for terminating crimping type contacts but useless for piercing type contacts which are also widely used, thus requiring separate piercing termination tools, too, resulting in the increased facility costs.

SUMMARY OF THE INVENTION

According to the invention there is provided a termination tool for terminating a conductor to a contact or terminal which has a connecting section for connection with the conductor and a contacting section for contact with a mating contact, the connecting section having either piercing walls or clamp tabs and strain relief tabs, characterized by a fixed base for supporting the contact; and a movable die movable toward the fixed base to terminate the contact by either piercing or crimping.

The piercing and crimping dies of this termination tool are very easy to exchange to meet user's need to terminate contacts of both piercing and crimping types.

Other objects, features, and advantages of the invention will be apparent from the following description when taken in conjuction with the accompanying drawings.

DESCRIPTION OF THE PREFERRED EMBODIMENTS

Figure 1:
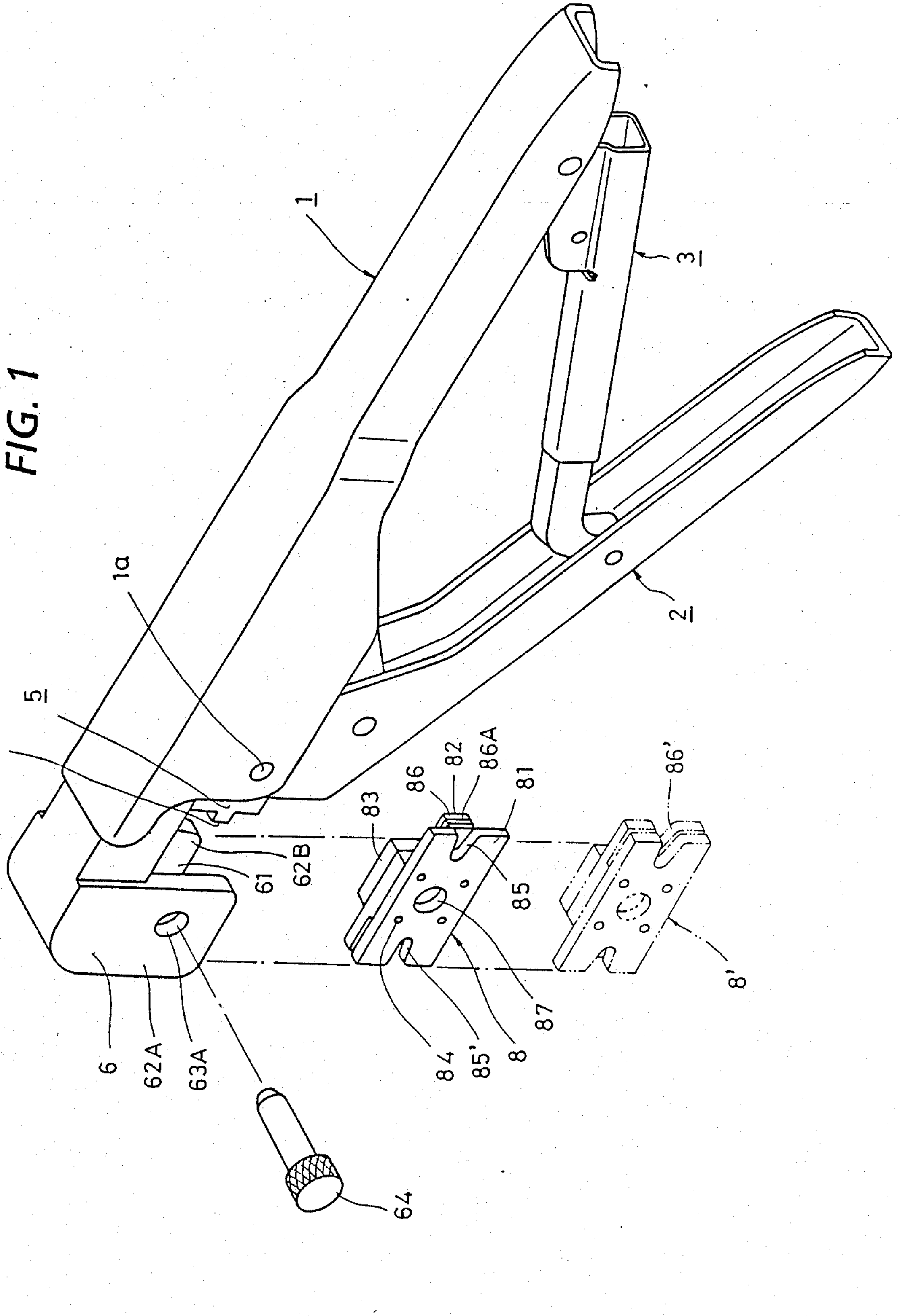
FIG. 1 is an exploded perspective view of a termination tool according to the invention.

In FIG. 1, there is shown a manual termination tool, with its essential parts exploded, which is almost identical with the afore-mentioned conventional manual crimping tool except for a movable die 8.

Like the conventional one, the movable die 8 consists of a sheath crimping plate 81, a wire crimping plate 82, and a reinforcing plate 83, which are brought together with a plurality of knock pins 84. Alternatively, they may be brought together with welding, adhesive, or screws. This movable die 8 is made useful for both piercing and crimping operations.

Figure 2:
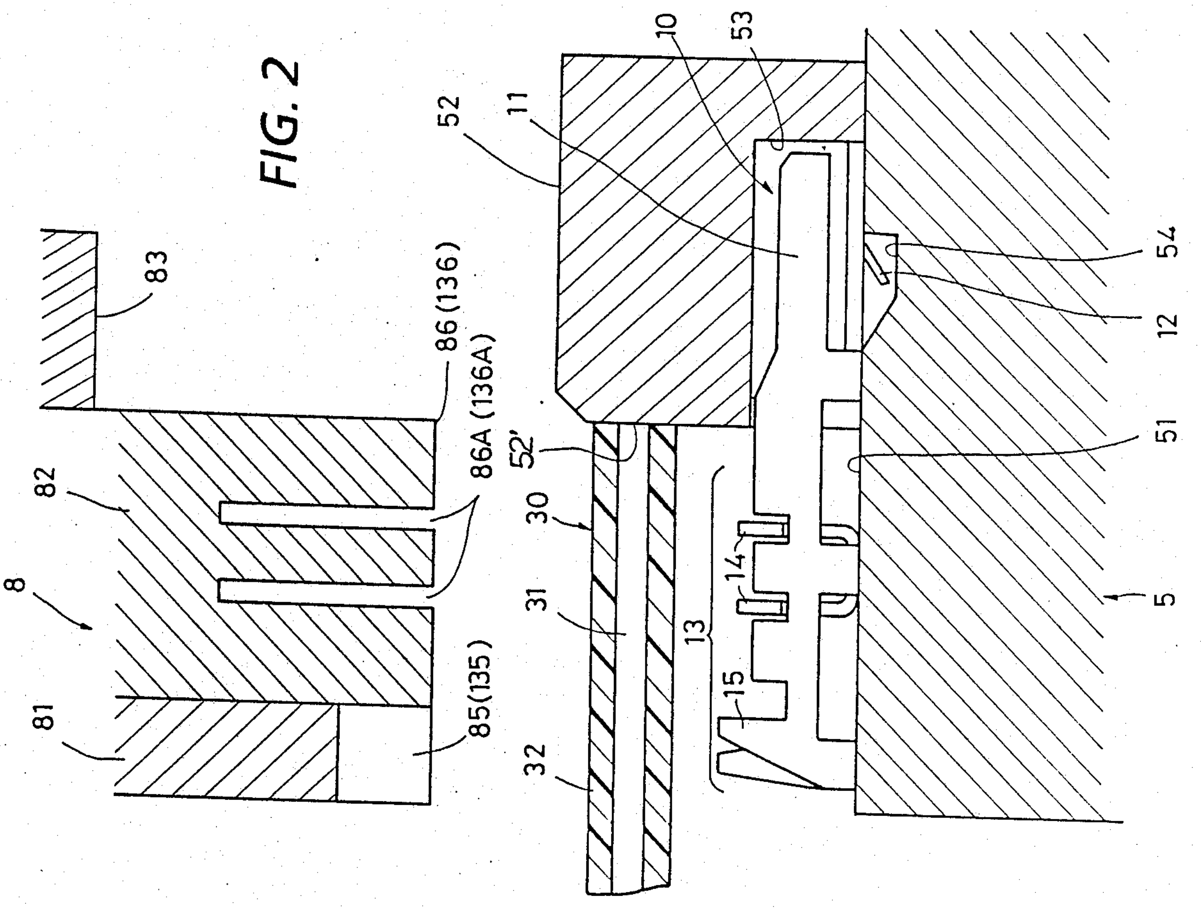
FIGS. 2 and 3 are sectional views of the head portion of the termination tool for termination by piercing and by crimping, respectively.
Figure 3:
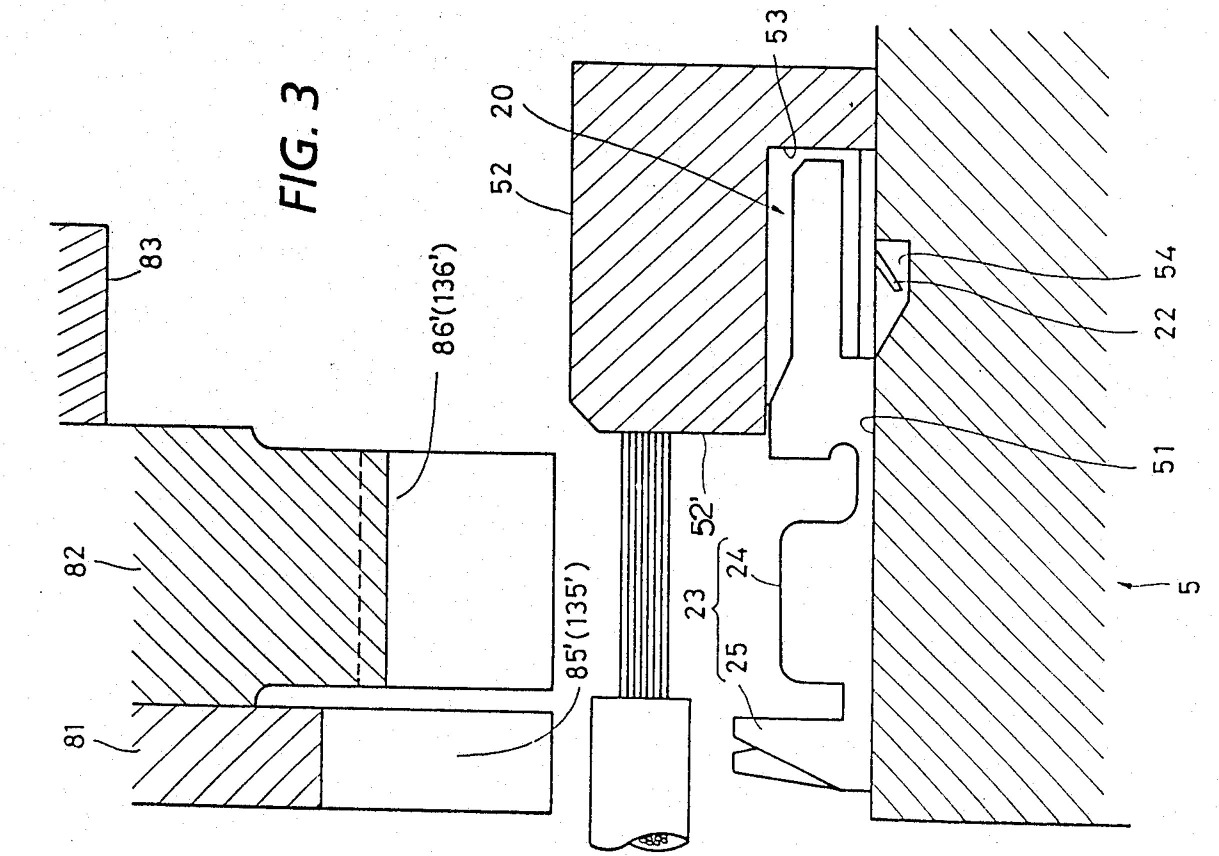
Figure 4:
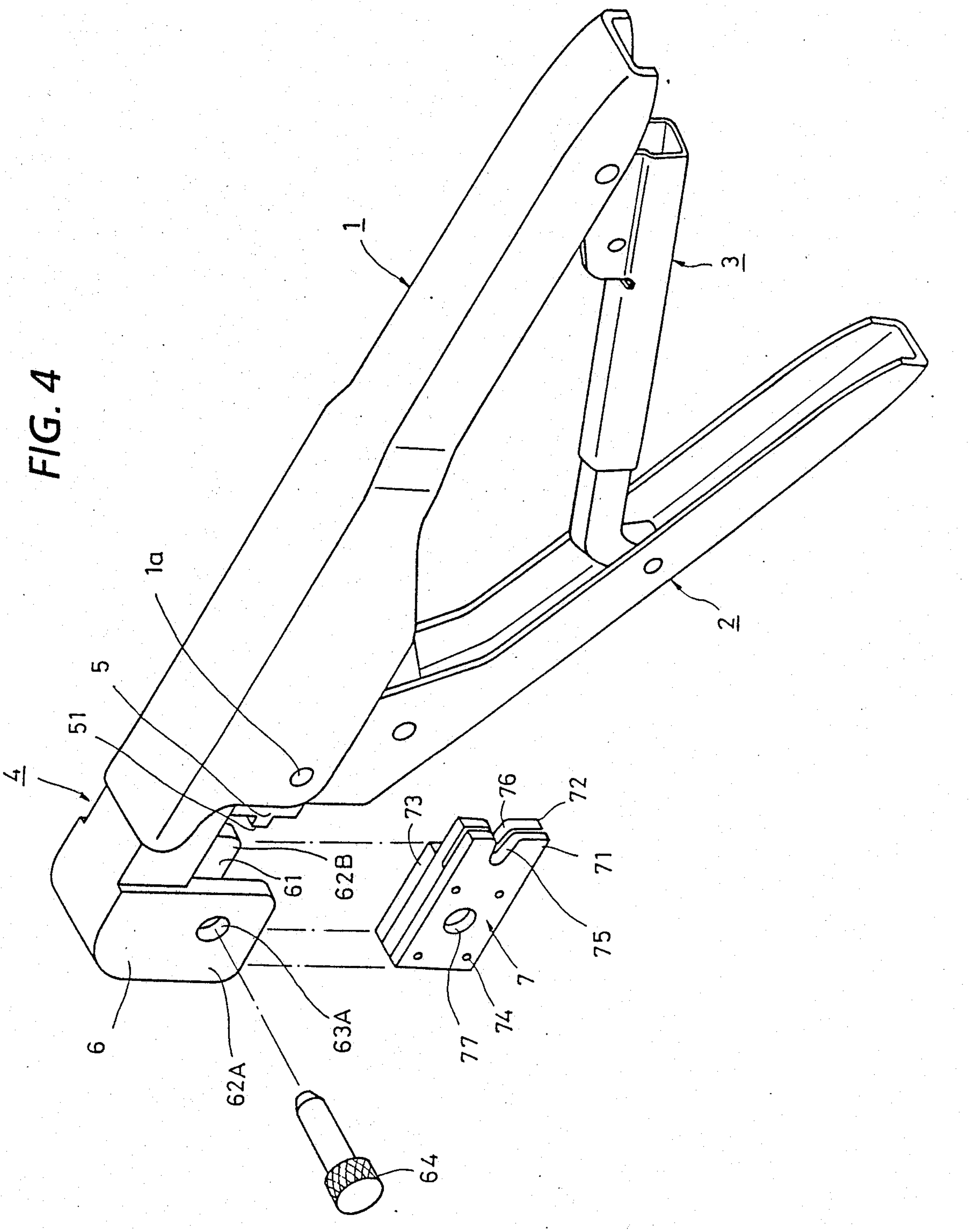
FIG. 4 is an exploded perspective view of a termination tool according to the prior art.

The sheath crimping plate 81 has at one end a U-shaped recess 85 for crimping strain relief tabs 15 of a piercing type contact 10 (FIG. 2) and on the other end a U-shaped recess 85' for crimping strain relief tabs 25 of a crimping type contact 20 (FIG. 3). The wire crimping plate 82 has on the same side as the U-shaped recess 85 a flat portion 86 for termination by piercing of a conductor to the piercing type contact 10. As best shown in FIG. 2, the flat portion 86 has a pair of receiving slots 86A for receiving a pair of piercing walls 14 of a piercing section 13. As best shown in FIG. 3, the wire crimping plate 82 has on the opposite side or the same side as the U-shaped recess 85' a U-shaped cross-section channel 86' for crimping clamp tabs 24 to secure the wires of a conductor. The crimping channel 86' has on the bottom a ridge with a top of an acute angle for bending around free ends of the clamp tabs 24. The reinforcing plate 83 is substantially identical with the conventional one.

The movable die 8 has at the center an aperture 87 for receiving a shaft 64. By removing the shaft 64 the movable die 8 may be turned around by 180 degrees so that the termination tool may be used to terminate both piercing and crimping type contacts.

Piercing Type Contact (1) The movable die 8 is mounted in the opening 61 of the movable head 6 with the shaft screw 64 in such a manner that the flat portion 86 may face toward the contact support 51.

(2) A piercing type contact 10 is inserted into the receiving recess 53 so that the back of the contact may rest on the support 51. As best shown in FIG. 2, the contacting section 11 of the contact 10 is inserted into the receiving recess 53 formed in the support section 52, with the latch tab 12 received in the recess 54 provided on the bottom of the receiving recess 53.

(3) A conductor 30 is placed over the connecting section 13 of the contact 10 without removing the sheath 32 so that the front end of a wire 31 abuts an abutment face 52' of the support section 52 for accurate positioning of the conductor 30.

(4) The fixed and movable grips 1 and 2 are squeezed to connect by piercing the conductor 30 to the connecting section 13 of the contact 10. More specifically, the conductor 30 is pushed into the slits of the piercing walls 14 so that the wire 31 may come into contact with the piercing walls while the strain relief tabs 15 are crimped on the sheath 32 to secure the conductor 30.

(5) The fixed and movable grips 1 and 2 are released to the original postions, respectively, and the terminated contact is now removable from the base 5.

Crimping Type Contact (1) After the shaft 64 is removed, the movable die 8 is turned around by 180 degrees and fixed with the shaft screw 64 so that the crimping recess 86' face the fixed base 5 as shown with a two-dot chain line in FIG. 1.

(2) As FIG. 3 shows, a conductor, with lengths of wires exposed for termination, is placed over the a crimping type contact 20 so that the front ends of the wires abut the abutment face 52' of the support section 52 for accurate positioning of the conductor.

(3) The fixed and movable grips 1 and 2 are squeezed so that the clamp tabs 24 are crimped around the wires by the crimping channel 86'. Like the above piercing contact, the strain relief tabs 25 are crimped on the sheath to secure the conductor.

Alternatively, the movable grip 2 may be moved pneumatically or hydraulically. The movable die 8 may be made so that it is able to turn by loosening the shaft screw without removing it completely. Two separate piercing and crimping dies may also be used.

The termination tool of the invention enables one to terminate both piercing and crimping type contacts with a single tool, thus reducing the facility costs. Since it is so easy to change the piercing die to the crimping die, or vice versa, the efficiency of work requiring both piercing and crimping operations in the same job is improved very much. Since the insulation piercing and crimping dies are made integral and always mounted on the tool for ready to use so that there is no need for storage of separate insulation piercing and crimping dies. In the support section, there is provided a receiving recess which surrounds the contact section of a contact during the cable termination operation so that the contact section is protected against deformation caused by collision with another object during the operation. There is also provided an abutment face against which the front end of a wire is abutted so that the conductor is connected to the connection section of a contact with high accuracy.

While a preferred embodiment of the invention has been described using specific terms, it is to be understood that changes and variations may be made without departing from the spirit and scope of the invention as recited in the the spirit and scope of the invention as recited in the appended claims.

I claim:

1. A termination tool capable of terminating a conductor to either piercing type contact with a pair of piercing walls or crimping type contact with a pair of clamp tabs, which comprises:

a fixed base for supporting either said piercing or crimping type contact, said fixed base including a contact support surface on which a connection section of said piercing or crimping type contact is placed, a receiving recess extending laterally from said contact support surface such that it surrounds a contact section of said piercing or crimping type contact, and an abutment face lying in a plane perpendicular to said contact support surface, against which a front end of said conductor is abutted for accurate positioning of said conductor;

a movable die having a piercing end adapted to terminate said conductor to said piercing type contact and a crimping end adapted to terminate said conductor to said crimping type contact, said piercing end having means to push said conductor into a piercing type contact so that insulation on said conductor is pierced by piercing walls on said piercing type contact and said crimping end having only means to deform tabs on said crimping type contact around a conductor seated in said crimping type contact; and means connecting said movable die to said tool for allowing selection of either said piercing or crimping end to be used for terminating operation according to said piercing or crimping type contact to be terminated.

2. The termination tool of claim 1, wherein said movable die is made integral and able to take a first position where said movable die is useful as a piercing die and a second position where said movable die is useful as a crimping die.

* * * * *